United States Patent
Hayashi

(10) Patent No.: US 10,266,630 B2
(45) Date of Patent: Apr. 23, 2019

(54) PHOTOCURABLE COMPOSITION, CURED PRODUCT FORMED FROM PHOTOCURABLE COMPOSITION, AND METHOD FOR MANUFACTURING SAID CURED PRODUCT

(71) Applicant: ADVANCED SOFTMATERIALS INC., Kashiwa-shi, Chiba (JP)

(72) Inventor: Yuki Hayashi, Kashiwa (JP)

(73) Assignee: ADVANCED SOFTMATERIALS INC., Kashiwa-shi, Chiba (JP)

( * ) Notice: Subject to any disclaimer, the term of this patent is extended or adjusted under 35 U.S.C. 154(b) by 0 days.

(21) Appl. No.: 15/524,236

(22) PCT Filed: Oct. 30, 2015

(86) PCT No.: PCT/JP2015/080671
§ 371 (c)(1),
(2) Date: May 3, 2017

(87) PCT Pub. No.: WO2016/072356
PCT Pub. Date: May 12, 2016

(65) Prior Publication Data
US 2017/0335044 A1    Nov. 23, 2017

(30) Foreign Application Priority Data

Nov. 4, 2014 (JP) .................. 2014-224104

(51) Int. Cl.

| | |
|---|---|
| *C08F 290/06* | (2006.01) |
| *C08F 2/48* | (2006.01) |
| *C08F 290/00* | (2006.01) |
| *C08G 65/332* | (2006.01) |
| *C08G 63/91* | (2006.01) |
| *C08G 83/00* | (2006.01) |
| *C08F 290/14* | (2006.01) |
| *C08F 222/10* | (2006.01) |

(52) U.S. Cl.
CPC ............ *C08F 290/061* (2013.01); *C08F 2/48* (2013.01); *C08F 290/00* (2013.01); *C08F 290/14* (2013.01); *C08G 63/912* (2013.01); *C08G 65/332* (2013.01); *C08G 83/007* (2013.01); *C08F 2222/1013* (2013.01)

(58) Field of Classification Search
CPC ...... C08F 290/061; C08F 290/00; C08F 2/48; C08F 2/50; C08F 290/14; C08F 2222/1013
See application file for complete search history.

(56) References Cited

U.S. PATENT DOCUMENTS

| | | | |
|---|---|---|---|
| 8,927,098 B2 | 1/2015 | Jung et al. | |
| 9,765,234 B2 * | 9/2017 | Kang | ................... C09D 135/02 |
| 9,884,969 B2 * | 2/2018 | Kim | ................... C08B 37/0012 |
| 2014/0080936 A1 | 3/2014 | Kim et al. | |
| 2015/0148443 A1 | 5/2015 | Kang et al. | |
| 2015/0299505 A1 | 10/2015 | Kang et al. | |

FOREIGN PATENT DOCUMENTS

| | | |
|---|---|---|
| EP | 2 873 693 A1 | 5/2015 |
| JP | 2008-291208 A | 12/2008 |
| WO | 2011/105532 A1 | 9/2011 |
| WO | 2013/176527 A1 | 11/2013 |
| WO | 2013/176528 A1 | 11/2013 |
| WO | 2013/180512 A1 | 12/2013 |
| WO | 2014/030845 A1 | 2/2014 |
| WO | 2014/030847 A1 | 2/2014 |

* cited by examiner

Primary Examiner — Sanza L. McClendon
(74) Attorney, Agent, or Firm — Christensen O'Connor Johnson Kindness PLLC

(57) ABSTRACT

The present invention provides a photocured product having both excellent toughness and high strength, and also provides a photocurable composition for forming said photocured product. The present invention provides a photocurable composition comprising: A. a (meth)acrylic acid ester monomer, wherein the glass transition temperature of a polymer formed from only said monomer is 20° C. or higher; B. a polyrotaxane obtained by respectively placing blocking groups at both ends of a pseudo-polyrotaxane, which is obtained by threading a linear molecule through the hole of a cyclic molecule, so as not to release the cyclic molecule, wherein the cyclic molecule has a (meth)acrylic group; and C. a photopolymerization initiator. The present invention also provides a photocured product formed from said composition.

11 Claims, No Drawings

PHOTOCURABLE COMPOSITION, CURED PRODUCT FORMED FROM PHOTOCURABLE COMPOSITION, AND METHOD FOR MANUFACTURING SAID CURED PRODUCT

TECHNICAL FIELD

The present invention relates to a photocurable composition comprising a (meth)acrylate ester monomer; a polyrotaxane, wherein a cyclic molecule has a (meth)acrylic group; and a photopolymerization initiator, a cured product formed from the photocurable composition, and a method for manufacturing the cured product.

BACKGROUND ART

Photocurable materials having an acrylic group as a radical polymerizable group have been widely used in electrical and electronic members, building materials, optical components, medical materials, and the like. In particular, there are a lot of use applications that require high strength of photocured products to be obtained by using photocurable materials. A photocured product having high strength can be generally obtained by increasing the number of radical polymerizable groups per volume. As a technique for increasing the number of radical polymerizable groups, a material having a plurality of acrylic functional groups and/or a material having a rigid skeleton may be used.

However, a photocured product obtained by using the above technique has high strength, while the photocured product has low toughness and the photocured product is brittle. Thus, the product has problems in that cracks occur due to shrinking upon curing or impact and/or the photocured product is not formed in a desired shape/dimension due to shrinking upon curing. Further, in association with these problems, a problem arises in that the photocured product is peeled off from a base material to which the photocured product is intended to be fixed or attached.

In order to solve these problems, it is known that a scheme in which a plasticizer is added to a photocurable material, to increase toughness of a photocured product having high strength to be obtained, or a scheme in which a plasticizer is added to a photocurable material, to impart flexibility to the photocured product having high strength to be obtained. However, when the plasticizer is used, a problem arises in that the plasticizer is leaked (bled out) on the surface of the photocured product. This causes a problem in decreased stability of the photocured product, for example, a problem in decreased biological safety in a case where the photocured product is used as a medical material.

A polyrotaxane has properties that, when a cyclic molecule constituting the polyrotaxane moves on the linear molecule, viscoelasticity, low compression permanent strain, and the like occur in a crosslinked body of polyrotaxanes, a crosslinked body of a polyrotaxane and a polymer other than the polyrotaxane, and the like. For this reason, the polyrotaxane is expected to be applied to various use applications, and thus, research and development thereof have been actively conducted.

For example, Patent Document 1 discloses a photocrosslinkable polyrotaxane, wherein a cyclic molecule of a polyrotaxane has a photopolymerizable group at side chain terminals of a lactone or carbonate polymer, a cured product formed by using the polyrotaxane, and the like. In addition, it is disclosed that the cured product has properties such as scratch resistance, folding resistance, and low hysteresis loss. However, the cured product disclosed in Patent Document 1 is a cured product having flexibility, and there is no disclosure on a cured product with high strength and high hardness.

PRIOR ART DOCUMENT

Patent Document

Patent Document 1: WO2011/105532

DISCLOSURE OF THE INVENTION

Problems to be Solved by the Invention

An object of the present invention is to provide a photocured product having both excellent toughness and high strength, preferably a photocured product having excellent toughness, for example, high impact strength, together with high strength and high elastic modulus.

Further, an object of the present invention is, in addition to the above object, to provide a photocurable composition which forms the above photo-cured product.

More, an object of the present invention is, in addition to, or other than the above objects, to provide a method for manufacturing the above photo-cured product.

Means for Solving Problems

The present inventor has found the following inventions:

<1> A photocurable composition comprising

A. a (meth)acrylate ester monomer, wherein the glass transition temperature of a polymer formed only from said monomer is 20° C. or higher;

B. a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule has a (meth)acrylic group; and C. a photopolymerization initiator.

<2> In the above item <1>, a weight ratio of the A. (meth)acrylate ester monomer to the B. polyrotaxane, A:B may be 100:0.5 to 100:35, preferably 100:1.0 to 100:30, more preferably 100:5.0 to 100:20.

<3> In the above item <1> or <2>, a viscosity of the composition at 25° C. may be 100,000 mPa·s or less, preferably from 500 to 60,000 mPa·s, more preferably from 700 to 40,000 mPa·s.

<4> In any one of the above items <1> to <3>, the composition may further comprise at least one selected from the group consisting of metal oxides, metal chlorides, metal carbonates, metal phosphates, carbon fine particles and resin fine particles, preferably at least one selected from the group consisting of metal oxides, metal chlorides and resin fine particles, more preferably at least one selected from the group consisting of metal oxides and resin fine particles.

<5> In any one of the above items <1> to <4>, the A. (meth)acrylate ester monomer may be derived from A-1. two molecules each comprising a monofunctional (meth)acrylic group having an amine or hydroxyl group; and A-2. one molecule of dioxiranes, dioxetanes, diisocyanates, or carboxylic dianhydrides.

<6> In any one of the above items <1> to <5>, the A. (meth)acrylate ester monomer may be a monomer represented by any one of the following Formulae I to III:

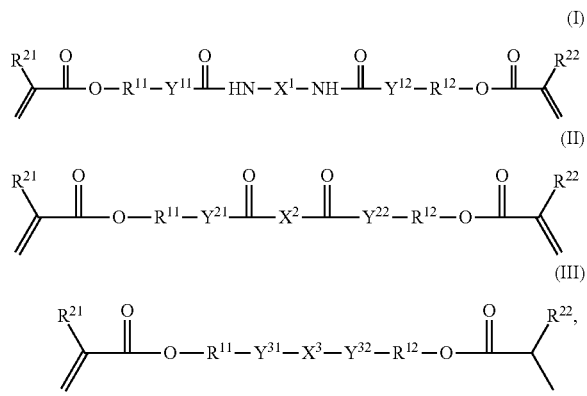

wherein $R^{21}$ and $R^{22}$ each independently represents a hydrogen atom or a methyl group;

$R^{11}$ and $R^{12}$ each independently represents one selected from the group consisting of a linear or branched alkylene group having 2 to 18 carbon atoms, preferably 2 to 12 carbon atoms, more preferably 2 to 8 carbon atoms, a cycloalkylene group, which may have (a) substituent(s), having 3 to 18 carbon atoms, preferably 5 to 16 carbon atoms, more preferably 6 to 12 carbon atoms, an arylene group, which may have (a) substituent(s), having 6 to 18 carbon atoms, preferably 6 to 16 carbon atoms, more preferably 6 to 12 carbon atoms, a (poly)alkyleneoxy group, and a (poly)ethyleneamine group;

$X^1$ to $X^3$ each independently represents one selected from the group consisting of a linear or branched alkylene group having 2 to 18 carbon atoms, preferably 2 to 12 carbon atoms, more preferably 2 to 8 carbon atoms (when the linear or branched alkylene group has 3 or more carbon atoms, a carbon(s) on the linear chain or branched chain may be substituted with an oxygen(s) to form an ether bond, and one or more of hydrogens of the alkylene group may be substituted with a hydroxyl group or a carboxyl group), a cycloalkylene group, which may have (a) substituent(s), having 3 to 18 carbon atoms, preferably 5 to 16 carbon atoms, more preferably 6 to 12 carbon atoms, and an arylene group, which may have (a) substituent(s), having 6 to 18 carbon atoms, preferably 6 to 16 carbon atoms, more preferably 6 to 12 carbon atoms; and $Y^{11}$, $Y^{12}$, $Y^{21}$, $Y^{22}$, $Y^{31}$, and $Y^{32}$ each independently represents an —O— group or an —NH— group.

<7> In any one of the above items <1> to <6>, an amount of the (meth)acrylic group of the B. polyrotaxane may be 0.015 to 2.0 mmol, preferably 0.050 to 1.30 mmol, more preferably 0.15 to 1.50 mmol in 1 g of the B. polyrotaxane.

<8> In any one of the above items <1> to <7>, the cyclic molecule of the B. polyrotaxane may have a ring-opening polymerization site formed from lactone monomers.

<9> A cured product derived from the photocurable composition described in any one of the above items <1> to <8>. In particular, a cured product formed by photo-irradiating and curing the photocurable composition described in any one of the above items <1> to <8>.

<10> In the above item <9>, a tensile elastic modulus of the cured product may be 100 MPa or more, preferably from 200 to 2,000 MPa, more preferably from 700 to 1,500 MPa.

<11> In the above item <9> or <10>, an impact strength ratio determined by an Izod impact strength test of the cured product (M) to the cured product (N) formed from the components excluding the B. polyrotaxane from the composition constituting the cured product ((the impact strength of M)/(the impact strength of N)) may be 1.10 or more, preferably from 1.50 to 5.0, more preferably from 1.8 to 3.5.

<12> A method for manufacturing a cured product, comprising the steps of:

i) preparing the photocurable composition described in any one of the above items <1> to <8>;

ii) forming the composition in a predetermined shape; and iii) irradiating the resulting predetermined shape with light;

to obtain the cured product.

Effects of the Invention

The present invention can provide a photocured product having both excellent toughness and high strength, preferably a photocured product having excellent toughness, for example, high impact strength, together with high strength and high elastic modulus.

Further, the present invention can, in addition to the above effect, provide a photocurable composition which forms the above photo-cured product.

More, the present invention can, in addition to, or other than the above effects, provide a method for manufacturing the above photo-cured product.

EMBODIMENTS FOR CARRYING OUT THE INVENTION

The present invention will be described in detail hereinafter.

The present application discloses a photocurable composition comprising a (meth)acrylate ester monomer; a polyrotaxane which has a cyclic molecule having a (meth)acrylic group; and a photopolymerization initiator, a cured product formed from the photocurable composition, and a method for manufacturing the cured product. Hereinafter, these will be described.

<Photocurable Composition>

The present application discloses a photocurable composition comprising:

A. a (meth)acrylate ester monomer;

B. a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule has a (meth)acrylic group; and C. a photopolymerization initiator.

Hereinafter, "A. (meth)acrylate ester monomer", "B. polyrotaxane", and "C. photopolymerization initiator" will be described in this order.

<<A. (Meth)Acrylate Ester Monomer>>

The A. (meth)acrylate ester monomer according to the present application is that a glass transition temperature of a polymer formed only from the monomer is 20° C. or higher, preferably 30° C. or higher, more preferably 40° C. or higher.

The expression "glass transition temperature of a polymer formed only from the monomer" means that the polymer to be formed is derived only from the A. (meth)acrylate ester monomer. The A. (meth)acrylate ester monomer may be one kind, or two kinds or more. Therefore, the term "polymer" may be a homopolymer formed only from one kind of monomer or a copolymer formed only from two or more kinds of monomer.

The glass transition temperature of the polymer formed only from the A. (meth)acrylate ester monomer may be obtained by directly measuring the glass transition temperature of the polymer obtained, or if the polymer is a copolymer, may be obtained from FOX's equation as described later. In a case where the glass transition temperature is directly measured, the glass transition temperature can be measured by differential scanning calorimetry (DSC) or a tan δ peak of dynamic viscoelasticity.

Herein, the FOX's equation is a technique of obtaining the glass transition temperature of a copolymer by following (Equation 1) and (Equation 2) in a case where the polymer is the copolymer. As described above, when two or more kinds of monomer are used as the A. (meth)acrylate ester monomer, two or more kinds of "the A. (meth)acrylate ester monomer" may be selected such that the glass transition temperature obtained by the FOX's equation is in the above range.

$$1/Tg=(W_1/Tg_1)+(W_2/Tg_2)+\ldots+(W_n/Tg_n) \quad \text{(Equation 1)}$$

$$W_1+W_2+\ldots+W_n=1 \quad \text{(Equation 2)}$$

In (Equation 1), Tg represents the glass transition temperature (K) of the copolymer, and $Tg_1$, $Tg_2$, ..., and $Tg_n$ represent the glass transition temperatures (K) of respective homopolymers of a first monomer, a second monomer, ..., and an n-th monomer. In addition, in (Equation 1) and (Equation 2), $W_1$, $W_2$, ... $W_n$ represent weight fractions of the first monomer, the second monomer, ..., and the n-th monomer, respectively. For example, a value described in Polymer Handbook Third Edition (Wiley-Interscience 1989) may be used as the glass transition temperature of each homopolymer.

In the present application, following examples of the A. (meth)acrylate ester monomer may be listed, but are not limited thereto. Furthermore, numerical values in the parentheses of monomers to be described below represent values of glass transition temperatures Tg of homopolymers formed only from the monomers.

Examples of the A. (meth)acrylate ester monomer may include monofunctional (meth)acrylates such as methyl methacrylate (105° C.), acrylonitrile (97° C.), acrylamide (165° C.), stearyl methacrylate (38° C.), isobornyl acrylate (97° C.), adamantyl acrylate (153° C.), dicyclopentenyl acrylate (120° C.), cyclohexyl methacrylate (110° C.), dicyclopentenyloxyethyl methacrylate (40° C.), phenoxyethyl methacrylate (36° C.), 2-hydroxyethyl methacrylate (55° C.), n-butyl methacrylate (20° C.), benzyl methacrylate (54° C.), glycidyl methacrylate (46° C.), tribromophenylacrylate (98° C.), adamantylmethacrylate (250° C.), or β-carboxyl ethyl acrylate (37° C.);

difunctional (meth)acrylates such as dipropylene glycol diacrylate (110° C.), tripropylene glycol diacrylate (90° C.), triethylene glycol dimethacrylate (65° C.), polyethylene glycol 200 diacrylate (23° C.), 1.6-hexanediol diacrylate (105° C.), 1,9-nonanediol diacrylate (67° C.), neopentyl glycol diacrylate (117° C.), bisphenol A ethylene oxide adduct diacrylate (75° C.), or bisphenol A diglycidyl methacrylate (67° C.); and polyfunctional (meth)acrylates such as tris(2-acryloxyethyl)isocyanurate (Tg>250° C.), pentaerythritol triacrylate (Tg>250° C.), dipentaerythritol polyacrylate (Tg>250° C.), or trimethylol propane triacrylate (Tg>250° C.)

Further, when two or more kinds of monomer are used as the A. (meth)acrylate ester monomer, as described above, the glass transition temperature of the copolymer as obtained by the FOX's equation may be 20° C. or higher, preferably 30° C. or higher, more preferably 40° C. or higher.

When the glass transition temperature of the copolymer is the above value, a (meth)acrylate ester monomer having a glass transition temperature of 20° C. or lower may be contained in the components of the copolymer. Examples of the (meth)acrylate ester monomers each having a glass transition temperature of 20° C. or lower may include 2-ethylhexyl acrylate, 2-ethylhexyl methacrylate, n-butyl acrylate, ethoxyphenyl acrylate, polyethylene glycol 400 diacrylate and the like. More specifically, when 2-ethylhexyl methacrylate (−10° C.) (weight fraction: 0.3) and triethylene glycol dimethacrylate (65° C.) (weight fraction: 0.7) are used as two kinds of monomer, the glass transition temperature of the copolymer is obtained by the above FOX's equation to have a value of 39° C., and the two kinds of monomer in the above weight fractions can be used.

Regarding the A. (meth)acrylate ester monomer of the present application, the "A. (meth)acrylate ester monomer" may have a high weight ratio in a weight ratio of the A. (meth)acrylate ester monomer and the B. polyrotaxane described later. Specifically, the "A. (meth)acrylate ester monomer":the "B. polyrotaxane" may be 100:0.5 to 100:35, preferably 100:1.0 to 100:30, more preferably 100:5.0 to 100:20.

The A. (meth)acrylate ester monomer may be derived from A-1. two molecules each comprising a monofunctional (meth)acrylic group having an amine or hydroxyl group; and A-2. one molecule of dioxiranes, dioxetanes, diisocyanates, or carboxylic dianhydrides.

Examples of the A-1. molecule comprising a monofunctional (meth)acrylic group having an amine or hydroxyl group may include, but are not limited to, 2-hydroxyethyl acrylate, 2-hydroxyethyl methacrylate, 4-hydroxybutyl acrylate, 2-hydroxybutyl methacrylate, 2-hydroxy-3-phenoxypropyl acrylate, 1,4-cyclohexanedimethanol monoacrylate, 2-hydroxypropyl methacrylate, polyethylene glycol monomethacrylate, polypropylene glycol monomethacrylate, aminoethyl methacrylate (hydrochloride), acrylamide, methacrylamide, N-n-butoxymethyl acrylamide, N-methoxymethyl acrylamide, and the like.

Further, examples of the A-2. dioxiranes, dioxetanes, diisocyanates, or carboxylic dianhydrides may include, but are not limited to, dioxiranes or dioxetanes such as bisphenol A diglycidyl ether, tetramethyl bisphenol A diglycidyl ether, bisphenol F diglycidyl ether, 3,4-epoxycyclohexylmethyl 3,4-epoxycyclohexane carboxylate, 1,4-cyclohexanedimethanol diglycidyl ether, neopentyl glycol diglycidyl ether, polypropylene glycol diglycidyl ether, tetrakisphenol ethane epoxy, phenol novolac epoxy, naphthalene novolac epoxy, ARON OXETANE OXT-221, ARON OXETANE OXT-121 (manufactured by TOAGOSEI CO., LTD.) and the like;

diisocyanates such as hexamethylene diisocyanate, tolylene 2,4-diisocyanate, isophorone diisocyanate, trimethylhexamethylene diisocyanate, xylylene diisocyanate, 1,3-bis(isocyanatomethyl)cyclohexane, (4,4'-methylenedicyclohexyl)diisocyanate, 2,2,4-trimethylhexamethylene diisocyanate and the like; and carboxylic dianhydrides such as ethylene tetracarboxylic dianhydride, 2,3,4-butane tetracarboxylic dianhydride, 1,2,3,4-cyclobutane tetracarboxylic dianhydride, ethylenediaminetetraacetic dianhydride, pyromellitic dianhydride, ethylene glycol bisanhydrotrimellitate, glycerin bisanhydrotrimellitate monoacetate, 3,3',4,4'-diphenylsulfone tetracarboxylic dianhydride and the like.

The A. (meth)acrylate ester monomer may be represented by any one of the following Formulae I to III.

In Formulae I to III, $R^{21}$ and $R^{22}$ each independently represents a hydrogen atom or a methyl group;

$R^{11}$ and $R^{12}$ each independently represents one selected from the group consisting of a linear or branched alkylene group having 2 to 18 carbon atoms, preferably 2 to 12 carbon atoms, more preferably 2 to 8 carbon atoms, a cycloalkylene group, which may have (a) substituent(s), having 3 to 18 carbon atoms, preferably 5 to 16 carbon atoms, more preferably 6 to 12, an arylene group, which may have (a) substituent(s), having 6 to 18 carbon atoms, preferably 6 to 16 carbon atoms, more preferably 6 to 12 carbon atoms, a (poly)alkyleneoxy group, and a (poly)ethyleneamine group;

$X^1$ to $X^3$ each independently represents one selected from the group consisting of a linear or branched alkylene group having 2 to 18 carbon atoms, preferably 2 to 12 carbon atoms, more preferably 2 to 8 carbon atoms (when the linear or branched alkylene group has 3 or more carbon atoms, a carbon(s) on the linear chain or branched chain may be substituted with an oxygen(s) to form an ether bond, and one or more of hydrogens of the alkylene group may be substituted with a hydroxyl group or a carboxyl group), a cycloalkylene group, which may have (a) substituent(s), having 3 to 18 carbon atoms, preferably 5 to 16 carbon atoms, more preferably 6 to 12 carbon atoms, and an arylene group, which may have (a) substituent(s), having 6 to 18 carbon atoms, preferably 6 to 16 carbon atoms, more preferably 6 to 12 carbon atoms; and $Y^{11}$, $Y^{12}$, $Y^{21}$, $Y^{22}$, $Y^{31}$, and $Y^{32}$ each independently represents an —O— group or an —NH— group.

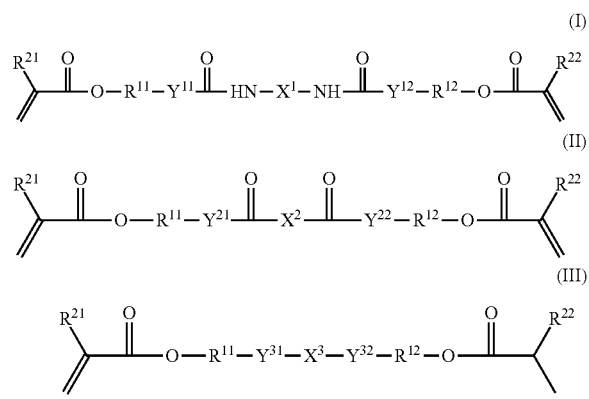

<<B. Polyrotaxane>>

The B. polyrotaxane is comprised of a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

<<B-1. Cyclic Molecule>>

The cyclic molecule of the B. polyrotaxane is not limited as long as the cyclic molecule may be cyclic, and may have a cavity, and a linear molecule is included in the cavity (cavities) of the cyclic molecules in a skewered manner.

The cyclic molecule has a (meth)acryl group, in order to form a bond with components other than the B. polyrotaxane in the photocurable composition, specifically, in order to form a bond with the A. (meth)acrylate ester monomer or a polymer of the A. (meth)acrylate ester monomer.

Examples of the (meth)acrylic group may include, but are not limited to, groups derived from "a compound having a (meth)acrylic group" such as (meth)acryloyloxyethyl isocyanate, (meth)acrylic acid, (meth)acrylic anhydride, (meth)acrylic chloride, 2-hydroxyethyl (meth)acrylate, 4-hydroxybutyl (meth)acrylate, glycidyl ether methacrylate, polyethylene glycol mono(meth)acrylate, polypropylene glycol mono(meth)acrylate, polycaprolactone-grafted hydroxyethyl (meth)acrylate (for example: PLACCEL F, manufactured by DAICEL CORPORATION) and the like.

The cyclic molecule having a (meth)acrylic group can be obtained, specifically, by reacting the "compound having an acrylic group" and a reaction group (such as a hydroxyl group, an amine group, or a carboxylic acid group) on the cyclic molecule.

An amount of the (meth)acrylic group may be 0.015 to 2.0 mmol, preferably 0.050 to 1.30 mmol, more preferably 1.15 to 1.50 mmol in 1 g of the B. polyrotaxane.

The cyclic molecule of the B. polyrotaxane may have a ring-opening polymerization site formed from lactone monomers. The ring-opening polymerization site may be provided in the cyclic molecule separately from the (meth)acrylic group or may be provided as a spacer site between the cyclic molecule and the (meth)acrylic group. Preferably, the ring-opening polymerization site may be provided as a spacer site between the cyclic molecule and the (meth)acrylic group.

The cyclic molecule may have the following group having a hydrophobic group in addition to the above-described groups, in consideration of compatibility with other components in the composition, a step of molding a crosslinked body from the composition, and the like.

Examples of the group having a hydrophobic group may include, but are not limited to, groups having a hydrophobic group such as an acetyl group, a butyl ester group, a butyl carbamate group, a cyclohexyl carbamoyl group, a hexyl ester group, an octadecyl ester group, a polyalkylene carbonate group, a polypropylene glycol group, a polytetramethylene glycol group, a methyl polyacrylate group, an ethylhexyl polyacrylate group, and the like.

The cyclic molecule may be, for example, selected from the group consisting of α-cyclodextrin, β-cyclodextrin and γ-cyclodextrin.

The above-described (meth)acrylic group or the group having a hydrophobic group can be obtained by substituting with a part of —OH groups in α-cyclodextrin.

<<B-2. Linear Molecule>>

The linear molecule of the B. polyrotaxane is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the B. polyrotaxane, the combination of (cyclic molecule, linear molecule) may be (one derived from a-cyclodextrin, one derived from polyethylene glycol).

<<B-3. Capping Group>>

The capping group of the B. polyrotaxane is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

As described above, the B. polyrotaxane has a low weight ratio in a weight ratio of the "A. (meth)acrylate ester monomer" and the B. polyrotaxane, "the A. (meth)acrylate ester monomer": "the B. polyrotaxane" may be 100:0.5 to 100:35, preferably 100:1.0 to 100:30, more preferably 100: 5.0 to 100:20.

<<C. Photopolymerization Initiator>>

In the present application, the C. photopolymerization initiator is not particularly limited as long as it is an initiator having properties capable of generating radical species and initiating radical polymerization of a monomer when the A. (meth)acrylate ester monomer is photo-irradiated and cured.

Examples of the C. photopolymerization initiator may include benzoin ether compounds such as benzoin ethyl ether, benzoin isopropyl ether, benzoin phenyl ether and the like;

acetophenone compounds such as acetophenone, 2,2-dimethoxyacetophenone, 1,1-dichloroacetophenone and the like;

benzyl ketal compounds such as benzyl dimethyl ketal, benzyl diethyl ketal and the like;

anthraquinone compounds such as 2-methylanthraquinone, 2-ethylanthraquinone, 2-t-butylanthraquinone, 1-chloroanthraquinone, 2-amylanthraquinone and the like;

phosphine compounds such as triphenylphosphine and the like;

benzoyl phosphine oxide compounds such as 2,4,6-trimethylbenzoyl-diphenyl-phosphine oxide (Lucirin (registered trademark) TPO) and the like;

bisacylphosphine oxide compounds such as bis(2,4,6-trimethylbenzoyl)-phenylphosphine oxide (Irgacure (registered trademark) 819) and the like;

benzophenone compounds such as benzophenone, 4,4'-bis(N,N'-dimethylamino)benzophenone and the like;

thioxanthone, or xanthone;

acridine derivatives; phenazine derivatives; quinoxaline derivatives; 1-phenyl-1,2-propanedione-2-O-benzoyloxime; and 1-aminophenyl ketone or 1-hydroxyphenyl ketone such as 4-(2-hydroxyethoxy)phenyl-2-propyl ketone (Irgacure (registered trademark) 2959), 1-hydroxycyclohexyl phenyl ketone (Irgacure (registered trademark) 184), 2-hydroxyisopropyl phenyl ketone, phenyl 1-hydroxyisopropyl ketone, 4-isopropyl phenyl 1-hydroxyisopropyl ketone and the like.

The C. photopolymerization initiator may be preferably a benzoyl phosphine oxide compound such as 2,4,6-trimethylbenzoyl-diphenyl-phosphine oxide (Lucirin (registered trademark) TPO); a bisacylphosphine oxide compound such as bis(2,4,6-trimethylbenzoyl)-phenylphosphine oxide (Irgacure (registered trademark) 819); or 1-hydroxyphenyl ketone such as 1-hydroxycyclohexyl phenyl ketone (Irgacure (registered trademark) 184), more preferably a benzoyl phosphine oxide compound such as 2,4,6-trimethylbenzoyl-diphenyl-phosphine oxide (Lucirin (registered trademark) TPO) or 1-hydroxyphenyl ketone such as 1-hydroxycyclohexyl phenyl ketone (Irgacure (registered trademark) 184).

An amount of the C. photopolymerization initiator is not particularly limited as long as it acts when the A. (meth) acrylate ester monomer is cured by light irradiation as described above, but may be 0.5 to 10 parts by weight, preferably 1.0 to 8.0 parts by weight, and more preferably 3.0 to 6.0 parts by weight based on 100 parts by weight of the A monomer.

<<Other Components in the Photocurable Composition>>

The photocurable composition of the present application may comprise "other components" in addition to the A to C components.

Examples of the other components may include, but are not limited to, metal oxide, metal chloride, metal carbonate, metal phosphate, carbon particles, polymer particles and the like.

Specifically, examples thereof may include, but are not limited to, silica, alumina, iron powder, zirconia, barium oxide, strontium oxide, quartz, titanium oxide, glass bead, glass fiber, talc, carbon black, carbon fiber, acrylic particles, ethylene particles, ethylene-vinyl acetate copolymer particles, styrene particles, styrene-butadiene particles, acrylonitrile-styrene particles, acrylonitrile-butadiene-styrene particles, polyimide particles, polyurethane particles, fluororesin particles and the like.

Further, the photocurable composition according to the present invention may have a solvent, depending on the use application.

<<Properties and the Like of the Photocurable Composition>>

The viscosity of the photocurable composition of the present application at 25° C. may be 100,000 mPa·s or less, preferably 500 to 60,000 mPa·s, more preferably 700 to 40,000 mPa·s.

<A Cured Product Formed from the Photocurable Composition and a Method for Producing the Cured Product>

The present application discloses a cured product formed from the above-described photocurable composition.

The cured product can be obtained by irradiating the photocurable composition with light to cure the photocurable composition.

For example, the cured product can be produced by following method. The method comprises the steps of:
i) preparing the above-described photocurable composition;
ii) forming the composition in a predetermined shape; and
iii) irradiating the resulting predetermined shape with light;
to obtain the cured product.

<<Step i)>>

In the above Step i), the photocurable composition can be prepared with reference to the above-described photocurable composition.

Specifically, the above Step i) may comprises the steps of:
i)-a) preparing the A. (meth)acrylate ester monomer;
i)-b) preparing the B. polyrotaxane; and
i)-c) preparing the C. photopolymerization initiator.

The above Step i) may further comprise i)-d) a step of preparing a photocurable composition formed from the A to C components.

The above Step i)-a) can be carried out by commercially purchasing the A. (meth)acrylate ester monomer and by newly preparing the A. (meth)acrylate ester monomer with reference to the above-described matters.

The above Step i)-b) prepares a polyrotaxane not having a (meth)acrylic group by the conventionally known technique, for example, by the technique described in WO2010/024431.

Thereafter, the B. polyrotaxane can be obtained by substituting a —OH group of the cyclic molecule of the resulting polyrotaxane with a group having a (meth)acrylic group. Furthermore, in a case where the —OH group is substituted with a group having a (meth)acrylic group, the —OH group of the cyclic molecule is substituted by a hydroxypropyl and/or polycaprolactone group at first, and then terminals of the resulting caprolactone group are further substituted with a (meth)acrylic group, to obtain the B. polyrotaxane.

Various conditions when the —OH group of the cyclic molecule is substituted with a group having a (meth)acrylic group depend on a cyclic molecule to be used, a (meth) acrylic group to be desired, and the like, but the conditions may include a normal temperature to 130° C. and a normal pressure.

In the above Step i)-c), the photopolymerization initiator can be prepared by commercially purchasing the desired C. photopolymerization initiator or by synthesizing the C. photopolymerization initiator by an existing method.

The above Step i)-d) is a step of preparing a photocurable composition comprising the A to C components, and the photocurable composition can be obtained by mixing the A to C components obtained above and the other components. Furthermore, a solvent may be used at the time of mixing, but it is preferable to remove the solvent after mixing.

<<Step ii)>>

The above Step ii) is a step of forming the composition obtained in the above Step i) in a predetermined shape.

The above Step ii) can be carried out by a conventionally known technique, and for example, can be carried out by a method of injecting the composition into molds having various shapes, a method of forming a sheet shape on a substrate or a support with a bar coater at a certain speed, a method of adding dropwise or extruding the composition to a specific medium which is not miscible with the composition to produce a composition having a desired shape such as a spherical shape or a fiber shape, or a method of molding a three-dimensional molded product by using a stereolithographic apparatus and a lamination technique such as vat photopolymerization.

<<Step iii)>>

The above Step iii) is a step of irradiating the predetermined shape obtained in the above Step ii) with light.

Light to be applied in the above Step iii) depends on the photocurable composition, the photopolymerization initiator used, thicknesses of the photocurable composition, a desired cured product, a light irradiation apparatus, and the like. However, for example, light having a light irradiation wavelength of 350 to 450 nm, particularly 365 nm, may be used, and a condition of a cumulative irradiation light amount of 100 to 2000 $mJ/cm^2$, or the like can be used.

Examples of the irradiation apparatus may include a high pressure mercury lamp, an ultra-high pressure mercury lamp, a metal halide lamp, a xenon lamp, and various lasers.

Furthermore, in the case of the molding method using such as a stereolithographic technique, the molding method can also be carried out by alternately performing Step ii) and Step iii) while lamination is continuously performed.

The method for producing a cured product may include other steps in addition to the above-described Steps i) to iii). For example, the other steps may include, but are not limited to, a step of heating the cured molded product after Step iii) to entirely complete the reaction, a step of removing air bubbles after Step ii), a step of performing heating in the presence of a thermal cross-linking agent after Step ii) to perform partial thermal cross-linking, and the like.

<Cured Product>

The cured product formed from the above-described photocurable composition, for example, the cured product obtained by the above-described production method may have a tensile elastic modulus of 100 MPa or more, preferably 200 to 2000 MPa, more preferably 700 to 1500 MPa.

Further, the cured product (M) formed from the above-described photocurable composition has an impact strength ratio determined by an Izod impact strength test of the cured product (M) to the cured product (N) formed from the components excluding the B. polyrotaxane from the composition constituting the cured product (M), (the impact strength of M)/(the impact strength of N) may be 1.10 or more, preferably 1.50 to 5.0, and more preferably 1.8 to 3.5.

<<Tensile Elastic Modulus, Tensile Strength, and Elongation>>

In the present application, the tensile elastic modulus, the tensile strength, and the elongation are measured by using AutoGraph AG-XPlus (manufactured by SHIMADZU CORPORATION).

Those properties are measured by a tensile test according to JIS K 7161:1994. A test sample is pulled, a ratio of tensile stress in a tensile proportion limit to strain is regarded as a tensile elastic modulus, and a stress at breakage is regarded as a tensile strength. Further, the elongation is based on the following equation. In the equation, the length of the test sample at breakage by pulling the test sample having a length $L_0$ before the test is designated as Lt.

Elongation (%)=$(Lt-L_0)/L_0 \times 100$

<<Impact Strength by Izod Impact Strength Test>>

The impact strength is measured by using a digital impact tester DG-UB Type (manufactured by Toyo Seiki Seisakusho, Ltd.) according to JIS K 7110.

The Izod impact strength test is an impact test method for evaluating strength (toughness) against impact, and the impact strength can be obtained in such a manner that a test sample is hit by using a pendulum impact hammer to break the test sample, and then, the energy required at breakage is divided by the width of the test sample. The energy required for breakage can be calculated from a lifting angle of the pendulum impact hammer and a raising angle of the hammer after the test.

<<Bending Elasticity and Bending Strength>>

A bending test is measured according to JIS K 7171.

A ratio of the stress within a bending proportion limit to the corresponding strain is regarded as a bending elastic modulus, and a stress at breakage is regarded as a bending strength.

<<Viscosity>>

A viscosity is measured by using a B-type viscometer (DV-E, manufactured by Brookfield AMETEK, Inc.).

Since the cured product of the present application has the above-described properties, specifically, has a high strength and a high tensile elastic modulus and/or a high toughness, the cured product can be used as various materials such as electrical and electronic members, building materials, optical components, and medical materials. Specifically, the cured product of the present application can be used for electrical insulating materials, pressure-sensitive adhesives/adhesives, optical protective film materials, hard coat films, materials for 3D printers/stereolithography, microscopic shape (pattern) molding materials, resist materials, coating materials for electrical components (mobile phones, home electrical appliances, and the like), interior materials of automobiles, print ink materials, printed circuit board materials, lens materials, materials for frame of glasses, binders of heat dissipation/heat conduction materials, system kitchen materials, furniture, exterior/interior tiles, musical instrument materials, floor materials, and the like. However, the use application thereof is not limited thereto.

The present invention will be illustrated more specifically by way of following Examples, but is not limited thereby.

EXAMPLES

<Preparation of A. (Meth)Acrylate Ester Monomer>

A base urethane dimethacrylate monomer DS3000 (liquid product at room temperature) obtained by reacting alkylene diisocyanate and a methacrylate having a hydroxyalkyl group at a molar ratio of alkylene diisocyanate:methacrylate having a hydroxyalkyl group of 1:2 was prepared. Furthermore, the glass transition temperature of a polymer formed only from the base urethane dimethacrylate monomer DS3000 monomer was about 65° C.

Further, triethylene glycol dimethacrylate (NK-3G, manufactured by Shin Nakamura Chemical Co., Ltd.) was prepared. Furthermore, the glass transition temperature of a polymer formed only from NK-3G was 65° C.

<B. Preparation of B. Polyrotaxane>

A polyrotaxane was prepared by the method described in WO2005/080469 or WO2010/024431.

Furthermore, the $^1$H-NMR analysis of the polyrotaxane as synthesized hereinafter was determined by 400 MHz JEOL JNM-AL400 (manufactured by JEOL Ltd.).

The measurement of the molecular weight and the molecular weight distribution of the polyrotaxane were carried out by using TOSOH HLC-8220 GPC instrument. The measurement was carried out under the conditions: column: TSK guard column Super AW-H and TSKgel Super AWM-H (two columns are linked); elution solution: dimethylsulfoxide (DMSO)/0.01 M LiBr; column oven: 50° C.; flow rate: 0.5 ml/min; sample concentration of about 0.2 wt/vol %; injection amount: 20 µl; pre-treatment: filtration using a 0.2 µm filter; and the standard molecular weight: PEO. Infrared spectroscopy (IR) was determined by Nicolet 4700 (manufactured by Thermo Fisher Scientific K.K.).

Synthesis Example 1: Preparation of a Polyrotaxane PR1 which has a Methacrylic Group A polyrotaxane (HAPR35) formed of a linear molecule: polyethylene glycol (Weight-average molecular weight: 35,000), a capping group: an adamantyl group, and a cyclic molecule: α-cyclodextrins having hydroxypropyl group was prepared in a manner similar to the method described in WO2005/080469 or WO2010/024431.

Into a three-necked flask, 1.0 g of the polyrotaxane (HAPR35) was added, and under a slow nitrogen flow, 4.5 g of ε-caprolactone was added thereto. After stirring the content homogeneously at 100° C. for 30 minutes by a mechanical stirrer, the reaction temperature was raised to 130° C., and then, 0.016 g of tin 2-ethylhexanoate diluted with ethyl acetate (50 wt % solution) was added thereto. The mixture was allowed to react for 5 hours, to obtain 5.5 g of a reaction product (a material obtained by introducing a polycaprolactone group to α-cyclodextrins in HAPR35, hereinafter, abbreviating "the material obtained by introducing a polycaprolactone group to α-cyclodextrins in HAPR35 as "HAPR35-g-PCL"). IR measurement of the reaction product resulted in the observation of a peak derived from an ester at 1736 cm$^{-1}$. Subsequently, the above HAPR35-g-PCL was dissolved using 2.5 g of ethyl acetate, and 0.46 g of 2-methacryloyloxy isocyanate (KARENZ MOI, manufactured by SHOWA DENKO K.K.) was added dropwise thereto. And then, the mixture was allowed to react at 80° C. for 4 hours. The consumption of peak (2270 cm$^{-1}$) of the isocyanate group was confirmed by IR measurement, to obtain 70 wt % ethyl acetate solution (PR1) of HAPR35-g-PCL having a 2-methacryloxycarbamate group. GPC determined the weight average molecular weight Mw of HAPR35-g-PCL having a 2-methacryloxycarbamate group: 758,000 and its molecular weight distribution Mw/Mn: 1.3. An amount of the methacrylic group in the HAPR35-g-PCL having a 2-methacryloxycarbamate group was 0.49 mmol/g.

Synthesis Example 2: Preparation of a Polyrotaxane PR2 which has a Methacrylic Group A 70 wt % ethyl acetate solution (PR2) of a polyrotaxane (HAPR20), a product obtained by introducing a polycaprolactone group to α-cyclodextrin in HAPR20 (hereinafter, abbreviating "HAPR20-g-PCL"), and a HAPR20-g-PCL having a 2-methacryloxycarbamate group was obtained in a manner similar to Synthesis Example 1, except that polyethylene glycol (weight average molecular weight: 20,000) was used as the linear molecule instead of polyethylene glycol (weight average molecular weight: 35,000) in Synthesis Example 1. GPC determined the weight average molecular weight Mw of HAPR20-g-PCL having a 2-methacryloxycarbamate group: 558,000 and its molecular weight distribution Mw/Mn: 1.3. An amount of the methacrylic group in HAPR20-g-PCL having a 2-methacryloxycarbamate group was 0.49 mmol/g.

Synthesis Example 3: Preparation of a Polyrotaxane PR2-1 which has a Methacrylic Group A 70 wt % ethyl acetate solution (PR2) of HAPR20-g-PCL having a 2-methacryloxycarbamate group was obtained in a manner similar to Synthesis Example 2, and then, 23.8 g of urethane methacrylate oligomer 1 (UM-1) was then mixed therewith. The resulting mixture was depressurized at 80° C. to remove ethyl acetate. The resulting non-solvent product was used as PR2-1.

Furthermore, the UM-1 was produced by following method. 10 g of polycaprolactone triol (PLACCEL 308, manufactured by DAICEL CORPORATION) and 5.1 g of 2-methacryloyloxy isocyanate (KARENZ MOI, manufactured by SHOWA DENKO K.K.) were reacted with each other in a reaction tank at 80° C. for 4 hours, and the reaction was terminated when it was confirmed by IR measurement that the peak (2270 $cm^{-1}$) of the isocyanate group was consumed. The resulting solution was used as UM-1.

Synthesis Example 4: Preparation of a Polyrotaxane PR3 which has a Methacrylic Group A polyrotaxane (HAPR11) including a linear molecule: polyethylene glycol (weight average molecular weight: 11,000), a capping group: an adamantyl group, and a cyclic molecule: α-cyclodextrin having a hydroxypropyl group was prepared in a manner similar to the method described in WO2005/080469 or WO2010/024431.

Into a three-necked flask, 1.0 g of the polyrotaxane (HAPR11) was added, and under a slow nitrogen flow, 3.5 g of ε-caprolactone was added thereto. After stirring the content homogeneously at 100° C. for 30 minutes by a mechanical stirrer, the reaction temperature was raised to 130° C., and then, 0.016 g of tin 2-ethylhexanoate, previously diluted with ethyl acetate (50 wt % solution), was added thereto. The mixture was allowed to react for 5 hours, to obtain 5.5 g of a reaction product (a material obtained by introducing a polycaprolactone group to α-cyclodextrins in HAPR11, hereinafter, abbreviating "the material obtained by introducing a polycaprolactone to α-cyclodextrins in HAPR11" as "HAPR11-g-PCL"). IR measurement of the reaction product resulted in the observation of a peak derived from an ester at 1736 $cm^{-1}$. Subsequently, the above HAPR11-g-PCL was dissolved using 2.1 g of ethyl acetate, and 0.94 g of 2-methacryloyloxy isocyanate (KARENZ MOI, manufactured by SHOWA DENKO K.K.) was added dropwise thereto. And then, the mixture was allowed to react at 80° C. for 4 hours. The consumption of peak (2270 $cm^{-1}$) of the isocyanate group was confirmed by IR measurement, to obtain a 70 wt % ethyl acetate solution (PR3) of HAPR11-g-PCL having a 2-methacryloxycarbamate group. GPC determined the weight average molecular weight Mw of HAPR11-g-PCL having a 2-methacryloxycarbamate group: 198,000 and its molecular weight distribution Mw/Mn: 1.2. An amount of the methacrylic group in the HAPR11-g-PCL having a 2-methacryloxycarbamate group was 1.11 mmol/g.

Synthesis Example 5: Preparation of a Polyrotaxane PR3-1 which has a Methacrylic Group A 70 wt % ethyl acetate solution (PR3) of HAPR11-g-PCL having a 2-methacryloxycarbamate group was obtained in a manner similar to Synthesis Example 4, and 19.8 g of urethane methacrylate oligomer 2 (UM-2) was then mixed therewith. The resulting mixture was depressurized at 80° C. to remove ethyl acetate. The resulting non-solvent product was used as PR3-1.

Furthermore, the UM-2 was produced by following method: 10 g of trifunctional isocyanate Duranate TPA-100 (manufactured by Asahi Kasei Corp.) was reacted with 6.0 g of a polycaprolactone adduct of 2-hydroxyethyl acrylate (PLACCEL FA2D, manufactured by DAICEL CORPORATION) at 80° C. for 4 hours, and the reaction was terminated when it was confirmed by IR measurement that the peak (2270 $cm^{-2}$) of the isocyanate group was consumed. The resulting solution was used as UM-2.

<C. Photopolymerization Initiator>

A 2,4,6-trimethylbenzoyl diphenyl phosphine oxide (Lucirin (registered trademark) TPO, manufactured by BASF) was used as a photopolymerization initiator.

Other Components

Example 1

A base urethane dimethacrylate monomer DS3000 as a (meth)acrylate ester monomer, the PR2 obtained in Synthesis Example 1 as a polyrotaxane, and 2,4,6-trimethylbenzoyl diphenyl phosphine oxide (Lucirin TPO, manufactured by BASF) as a photopolymerization initiator were mixed at a weight ratio described in the following Table 1. The resulting mixture was heated under reduced pressure to remove a solvent derived from the PR2, thereby obtaining a photocurable composition X-1. The viscosity of the resulting photocurable composition X-1 was measured.

The resulting photocurable composition X-1 was introduced into a predetermined mold, and cured by irradiation of ultraviolet rays of 365 nm at an irradiation light amount of 1000 $mJ/cm^2$, thereby to obtain a cured product XC-1.

Furthermore, the irradiation light amount of ultraviolet rays was changed depending on the thickness of the predetermined mold, but was in a range of 1000 to 3000 $mJ/cm^2$.

The cured product was cut into a necessary shape, and the cut surface thereof was polished. And then, the resulting product was used as a measurement sample for each test on the tensile elastic modulus, the tensile strength, the elongation, the bending elastic modulus, the bending strength, the Shore hardness D, and the impact strength. Furthermore, for the tensile elastic modulus, the tensile strength, and the impact strength, the above-described measurement methods were used. Test methods other than the above-described measurement methods are described below.

The resulting cured product XC-1 had a tensile elastic modulus of 1790 MPa, a tensile strength of 43 MPa, and a desired high strength. In addition, it is found that the impact strength representing toughness was 235 J/m, and thus the cured product had a desired toughness.

<<Tensile Elastic Modulus, Tensile Strength, and Elongation>>

The tensile elastic modulus, the tensile strength, and the elongation were measured by using AutoGraph AG-XPlus (manufactured by SHIMADZU CORPORATION) as described above. Specifically, the tensile elastic modulus, the tensile strength, and the elongation were measured by a tensile test according to JIS K 7161:1994. A test sample was pulled, a ratio of tensile stress in a tensile proportion limit to strain was regarded as a tensile elastic modulus, and a stress at breakage was regarded as a tensile strength. In addition, the elongation was determined based on following equation.

In the equation, the length of the test sample at breakage by pulling the test sample with a length $L_0$ before test was designated as Lt.

Elongation (%)=$(Lt-L_0)/L_0 \times 100$

<<Bending Elasticity and Bending Strength>>

Regarding the bending elastic modulus and the bending strength, the bending test was carried out according to JIS K 7171 as described above. That is, a ratio of the stress within a bending proportion limit to the corresponding strain was regarded as a bending elastic modulus and a stress at breakage was regarded as a bending strength.

<<Viscosity>>

The viscosity at room temperature (25° C.) was measured by using a B-type viscometer (DV-E, manufactured by Brookfield AMETEK, Inc.).

<<Shore Hardness D>>

The Shore hardness D was measured by using a surface hardness meter Asker D Type (manufactured by Kobunshi Keiki Co., Ltd.).

<<Impact Strength by Izod Impact Strength Test>>

The impact strength was measured by using a digital impact tester DG-UB Type (manufactured by Toyo Seiki Seisaku-sho, Ltd.) according to JIS K 7110. Furthermore, although a test in JIS K 7110 is carried out using a test sample attached with a "cutout" called a notch, the test described herein used an unnotched test sample.

Examples 2 to 7

Photocurable compositions X-2 to X-7 were obtained in a manner similar to Example 1, except that various components and the weight ratios thereof in Example 1 were changed to components and blending amounts described in Table 1.

Further, cured products XC-2 to XC-7 were obtained respectively from the photocurable compositions X-2 to X-7 in a manner similar to Example 1. Furthermore, similarly to Example 1, in Example 4 and Example 6, the step of removing solvents respectively derived from PR3 and PR1 was provided, but in Example 2, Example 3, and Example 5, since PR2-1 used and PR3-1 used did not have a solvent, the step of removing a solvent was not carried out.

Further, various properties of the resulting cured products XC-2 to XC-7 were measured in a manner similar to Example 1. The results thereof are shown in Table 1.

Table 1 shows that the cured products XC-2 to XC-7 had desired tensile elastic modulus, desired tensile strength, and desired impact strength.

Comparative Example 1

A photocurable composition Y-1 was obtained in a manner similar to Example 1, except that PR2 as the polyrotaxane component was excluded from various components of Example 1 and the step of removing a solvent before introducing into a predetermined mold was not performed. A cured product YC-1 was obtained from the photocurable composition Y-1. Further, the various properties of the cured product YC-1 were measured in a manner similar to Example 1. The results thereof are shown in Table 1.

Comparative Example 2

In Comparative Example 2, a photocurable composition Y-2 was obtained in a manner similar to Example 6, except that the polyrotaxane component was excluded from various components of Example 6, and a cured product YC-2 (Comparative Example 2) was obtained from the photocurable composition Y-2. The results thereof are shown in Table 1.

Comparative Example 3

A crosslinked body was obtained from a composition which did not comprise a (meth)acrylate ester monomer. That is, a crosslinked body was obtained from a composition obtained by mixing the polyrotaxane component PR2 and a photopolymerization initiator Lucirin TPO (manufactured by BASF), and then removing a solvent derived from PR2. Various properties of the crosslinked body were measured in a manner similar to Example 1. The results thereof are shown in Table 1. Furthermore, the composition of the Comparative Example 3 did not have a solvent. Thus, the composition was solid at room temperature and it was not possible to measure the viscosity thereof.

Table 1 shows that the cured products XC-1 to XC-5 (Examples 1 to 5) obtained by adding the polyrotaxane component to the (meth)acrylate ester monomer had increased tensile elastic modulus, increased tensile strength, increased bending elastic modulus, increased bending strength, and increased impact strength as compared to the cured product YC-1 (Comparative Example 1) which did not comprise the polyrotaxane component. Furthermore, regarding the elongation rate, it is found that the cured products XC-1 to XC-5 had similar to or enhanced properties as compared to the cured product YC-1.

In comparison of Example 6 with Comparative Example 2, similarly to the above, it is found that Example 6 had increased tensile elastic modulus, increased tensile strength, increased elongation, increased bending elastic modulus, increased bending strength, and increased impact strength as compared to Comparative Example 2.

TABLE 1

Compositions of photocurable compositions of Examples 1 to 6 and Comparative Examples 1 to 3, and physical properties of cured products formed from the compositions

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Composition | | | | | | | | | |
| DS3000 | 100 | 100 | 100 | 100 | 100 | 80 | 100 | 80 | |
| NK-3G | | | | | 12 | 20 | | 20 | |
| PR1 [1)] | | | | | | 14 | | | |
| PR2 [1)] | 14 | | | | | | | | 100 |

TABLE 1-continued

Compositions of photocurable compositions of Examples 1 to 6 and Comparative Examples 1 to 3, and physical properties of cured products formed from the compositions

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| PR2-1 |  | 14 | 29 |  |  |  |  |  |  |
| PR3 [1)] |  |  |  | 11 |  |  |  |  |  |
| PR3-1 |  |  |  |  | 20 |  |  |  |  |
| Lucirin TPO | 5.0 | 5.0 | 5.0 | 5.0 | 5.0 | 5.0 | 5.0 | 5.0 | 5.0 |
| Composition viscosity (mPa·s) | 6900 | 1600 | 2600 | 1000 | 1700 | 8000 | 750 | 700 | NA[2)] |
| Physical properties of cured product |  |  |  |  |  |  |  |  |  |
| Tensile elastic modulus (MPa) | 1790 | 1680 | 1490 | 1560 | 1660 | 1510 | 1480 | 1350 | 11 |
| Tensile strength (MPa) | 43 | 39 | 37 | 41 | 41 | 37 | 36 | 32 | 4 |
| Elongation (%) | 7.8 | 5.2 | 8.0 | 7.4 | 8.2 | 7.5 | 6.1 | 5.8 | 150 |
| Bending elastic modulus (MPa) | 1450 | 1350 | 1320 | 1630 | 1690 |  | 1220 |  |  |
| Bending strength (MPa) | 62 | 62 | 62 | 72 | 80 |  | 60 |  |  |
| Shore hardness D |  |  |  | 86 | 83 |  |  |  |  |
| Impact strength (J/m) | 235 | 185 | 211 | 218 | 201 | 125 | 99 | 68 | NA[3)] |

[1)] After mixing of the compositions, a solvent derived from PR1, PR2, or PR3 was heated under reduced pressure to be removed, thereby obtain a composition.
[2)] Viscosity measurement was impossible.
[3)] Measurement by the same method as in other test samples was impossible due to flexibility of the cured product.

What is claimed is:

1. A photocurable composition comprising:
   A. a difunctional (meth)acrylate ester monomer, wherein the glass transition temperature of a polymer formed only from said monomer is 20° C. or higher;
   B. a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule has a (meth)acrylic group; and
   C. a photopolymerization initiator;
   wherein a weight ratio of the A. difunctional (meth) acrylate ester monomer to the B. polyrotaxane, that is, A:B, is 100:0.5 to 100:35.

2. The composition according to claim 1, wherein a viscosity of the composition at 25° C. is 100,000 mPa·s or less.

3. The composition according to claim 1, further comprising at least one selected from the group consisting of metal oxides, metal chlorides, metal carbonates, metal phosphates, carbon fine particles, and resin fine particles.

4. The composition according to claim 1, wherein the A. difunctional (meth)acrylate ester monomer is derived from A-1. two molecules each comprising a monofunctional (meth)acrylic group having an amine or hydroxyl group; and
   A-2. one molecule of dioxiranes, dioxetanes, diisocyanates, or carboxylic dianhydrides.

5. The composition according to claim 1, wherein the A. difunctional (meth)acrylate ester monomer is a monomer represented by any one of the following Formulae I to III:

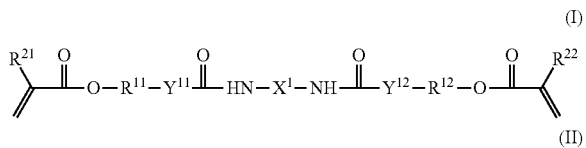

wherein $R^{21}$ and $R^{22}$ each independently represents a hydrogen atom or a methyl group;

$R^{11}$ and $R^{12}$ each independently represents one selected from the group consisting of a linear or branched alkylene group having 2 to 18 carbon atoms, a cycloalkylene group, which may have (a) substituent(s), having 3 to 18 carbon atoms, an arylene group, which may have (a) substituent(s), having 6 to 18 carbon atoms, a (poly)alkyleneoxy group, and a (poly)ethyleneamine group;

$X^1$ to $X^3$ each independently represents one selected from the group consisting of a linear or branched alkylene group having 2 to 18 carbon atoms (when the linear or branched alkylene group has 3 or more carbon atoms, a carbon(s) on the linear chain or branched chain may be substituted with an oxygen(s) to form an ether bond, and one or more of hydrogens of the alkylene group may be substituted with a hydroxyl group or a carboxyl group), a cycloalkylene group, which may have (a) substituent(s), having 3 to 18 carbon atoms, and an arylene group, which may have (a) substituent(s), having 6 to 18 carbon atoms; and $Y^{11}$, $Y^{12}$, $Y^{21}$, $Y^{22}$, $Y^{31}$, and $Y^{32}$ each independently represents an —O— group or an —NH— group.

6. The composition according to claim 1, wherein an amount of the (meth)acrylic group of the B. polyrotaxane is 0.015 to 2.0 mmol in 1 g of the B. polyrotaxane.

7. The composition according to claim 1, wherein the cyclic molecule of the B. polyrotaxane has a ring-opening polymerization site formed from lactone monomers.

8. A cured product formed by photo-irradiating and curing the photocurable composition according to claim 1.

9. The cured product according to claim 8, wherein a tensile elastic modulus of the cured product is 100 MPa or more.

10. The cured product according to claim 8, wherein an impact strength ratio determined by an Izod impact strength test of the cured product (M) according to claim 9 to the cured product (N) formed from components excluding the B. polyrotaxane from the composition constituting the cured product ((the impact strength of M)/(the impact strength of N)) is 1.10 or more.

11. A method for manufacturing a cured product, comprising the steps of:
  i) preparing the photocurable composition according to claim 1;
  ii) forming the composition in a predetermined shape; and
  iii) irradiating the resulting predetermined shape with light;
to obtain the cured product.

* * * * *